No. 640,045. Patented Dec. 26, 1899.
S. B. STOKELY & W. S. LIVENGOOD.
COMBINED PLOW AND PLANTER.
(Application filed Sept. 20, 1899.)

(No Model.) 4 Sheets—Sheet 1.

Witnesses
Inventors
S. B. Stokely
W. S. Livengood
By P. T. Dodge Attorney

No. 640,045. Patented Dec. 26, 1899.
S. B. STOKELY & W. S. LIVENGOOD.
COMBINED PLOW AND PLANTER.
(Application filed Sept. 20, 1899.)

(No Model.) 4 Sheets—Sheet 2.

No. 640,045. Patented Dec. 26, 1899.
S. B. STOKELY & W. S. LIVENGOOD.
COMBINED PLOW AND PLANTER.
(Application filed Sept. 20, 1899.)
(No Model.) 4 Sheets—Sheet 3.
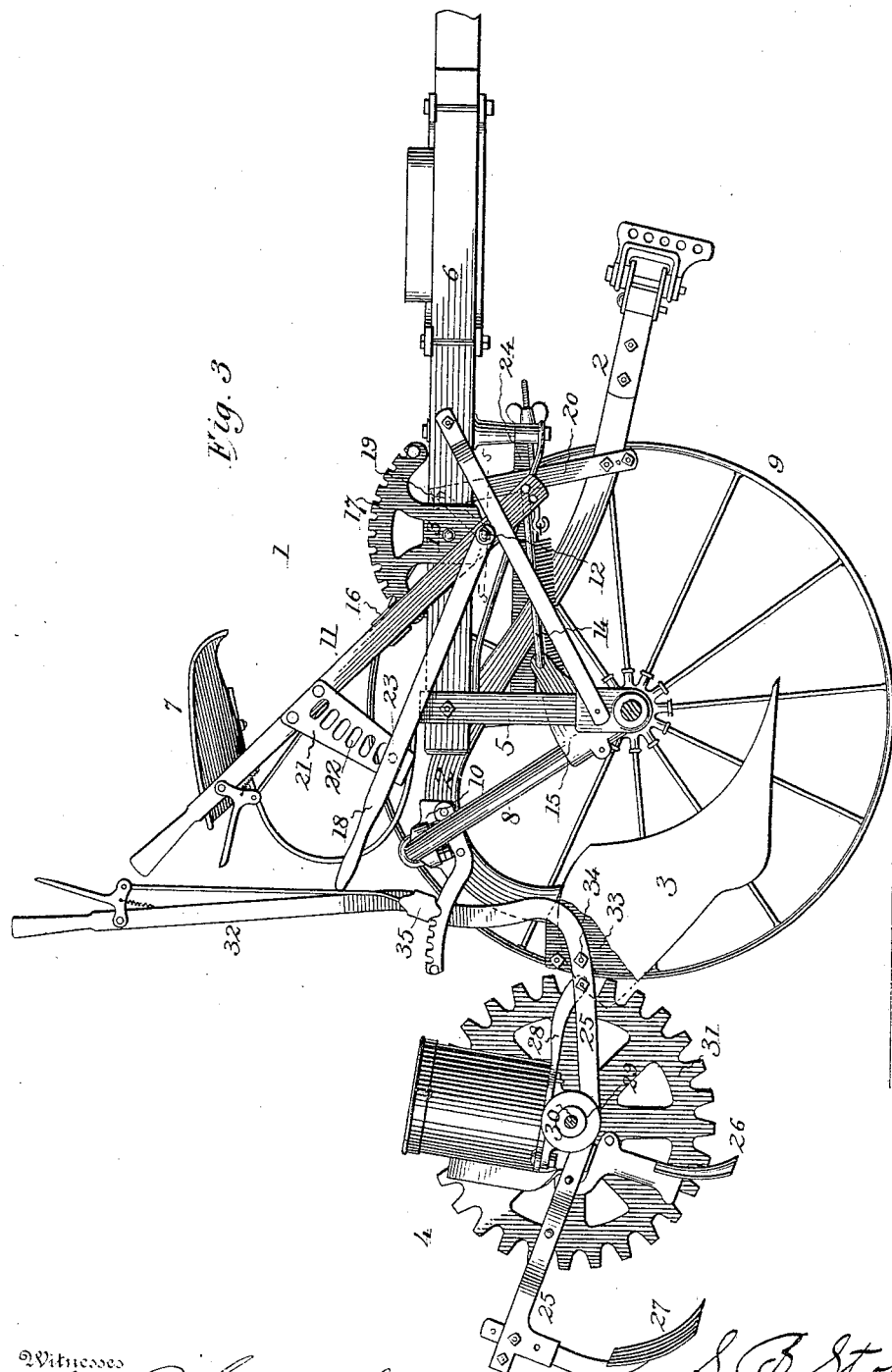

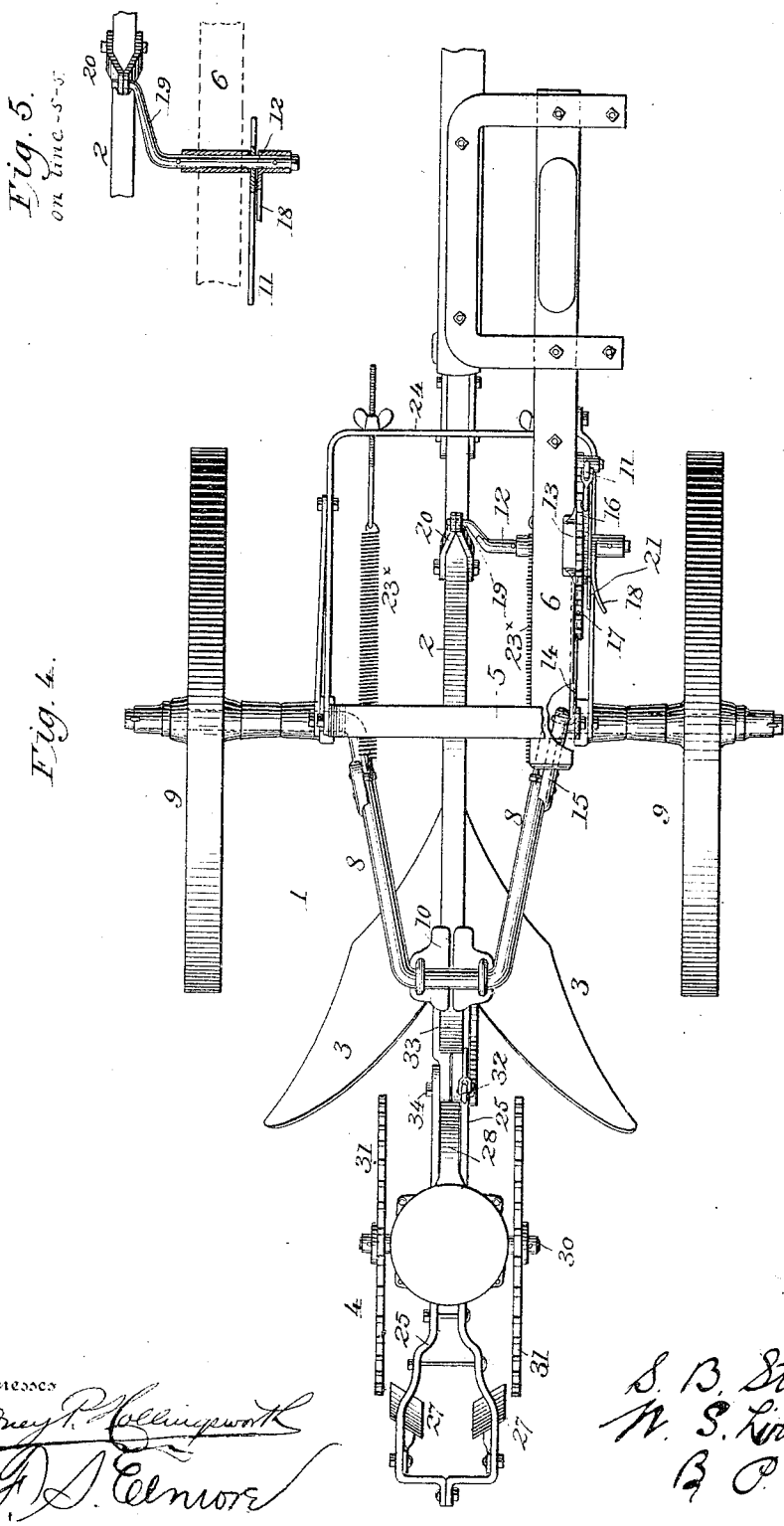

UNITED STATES PATENT OFFICE.

SAMUEL B. STOKELY AND WINFIELD S. LIVENGOOD, OF KANSAS CITY, MISSOURI, ASSIGNORS TO THE EAGLE MANUFACTURING COMPANY, OF MISSOURI.

COMBINED PLOW AND PLANTER.

SPECIFICATION forming part of Letters Patent No. 640,045, dated December 26, 1899.

Application filed September 20, 1899. Serial No. 731,130. (No model.)

*To all whom it may concern:*

Be it known that we, SAMUEL B. STOKELY and WINFIELD S. LIVENGOOD, of Kansas City, county of Jackson, and State of Missouri, have invented a new and useful Improvement in a Combined Plow and Planter, of which the following is a specification.

This invention relates to a combined lister plow and planter; and it consists of a wheeled plow-frame sustaining a plow-beam by means of improved adjusting devices, to which the plow-beam is attached by improved means, and a seeding mechanism adapted to deposit seed in the furrow formed by the plow.

The invention also consists in the details of construction and combination of parts hereinafter described and claimed.

Figure 1:
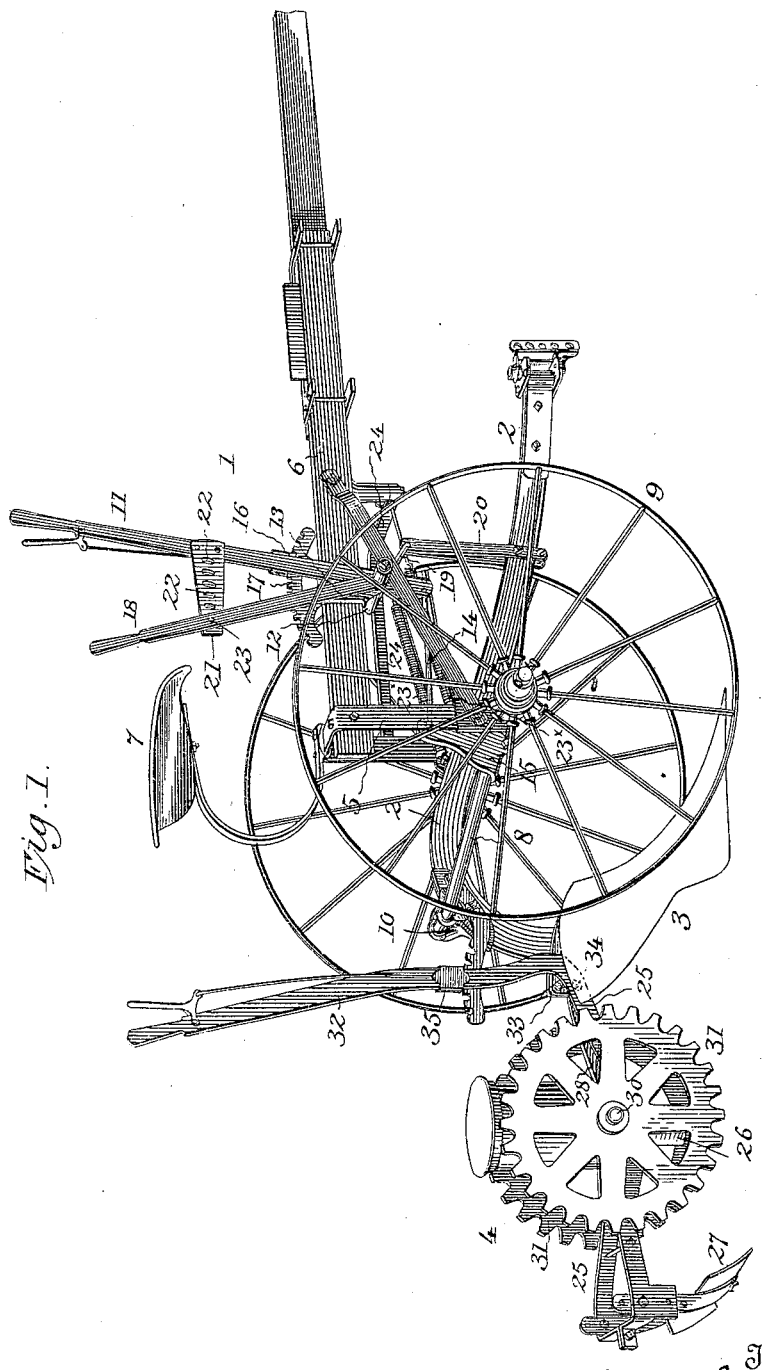
Figure 2:
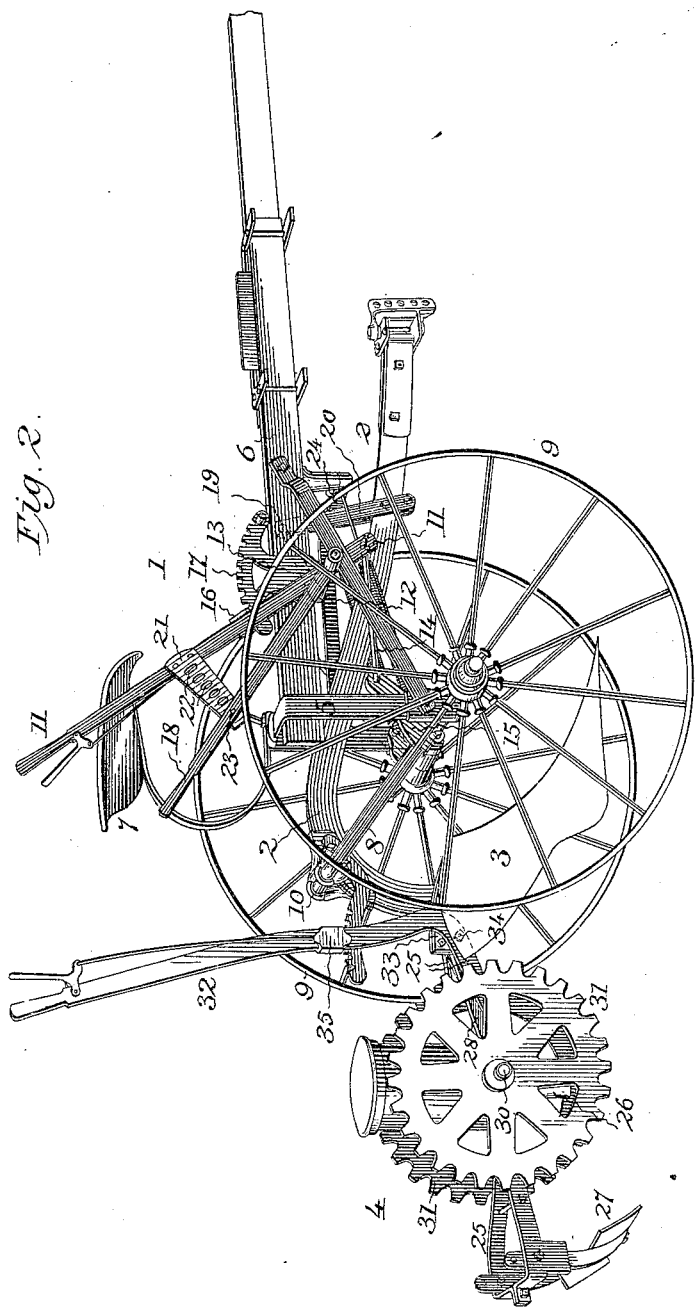

In the accompanying drawings, Figure 1 is a perspective view of the machine with the plow and seeding mechanism lowered into action. Fig. 2 is a similar view of the parts elevated out of action. Fig. 3 is a longitudinal sectional elevation of the machine. Fig. 4 is a top plan view. Fig. 5 is a horizontal sectional view on the line 5 5 of Fig. 3 looking downward.

Referring to the drawings, 1 represents a wheeled or sulky plow having the usual plow-beam 2, with its double moldboard 3, and 4 represents a seeding mechanism attached to the beam of the plow at its rear end, in a manner more fully described hereinafter, and adapted to deposit the seed in rear of the plow in the furrow formed thereby.

The frame of the plow comprises an arched member 5, to which is attached a tongue 6 and which gives support to a driver's seat 7. The arched frame has its ends loosely encircling, and it receives support from a crank-axle 8, adjacent to the ground-wheels 9, mounted on the horizontally-projecting ends of the axle. The cranked portion of the axle extends rearward and across the upper edge of the rear curved end of the plow-beam, to which it is jointed by two perforated ears 10, firmly fixed to the plow-beam, with the axle extending loosely through them. The movement of this crank-axle to raise or lower the plow-beam is effected by an adjusting-lever 11, mounted near its lower end loosely on a horizontal spindle 12, which extends through and has a bearing in a plate 13, fixed to the side of the tongue. The lower end of the lever below its axis is connected by a link 14 with a bracket 15, firmly fixed to one side of the axle adjacent to the ground-wheel, and as a result when the lever is drawn rearward it will pull forward on the crank-axle and elevate its rear end, where it is jointed to the plow-beam, and will raise the latter. The lever is locked in the position desired in order to maintain the beam at the required height by means of a locking-dog 16, sustained by the lever and adapted to engage teeth 17, formed in the upper edge of the plate 13. From this description it will be seen that by this lever the plow-beam may be raised bodily to avoid obstructions or in transferring the machine from field to field, or may be lowered at will into action.

In order that when the plow is lowered its level may be controlled at the will of the operator and the inclination of its point changed to meet the varying conditions encountered in practice, we provide for the oscillation of the beam on its connection with the crank-axle as an axis, which we accomplish by a second lever 18, extending alongside the other lever, with its lower end fixed to one end of the spindle 12, which latter is extended at its other end on the other side of the tongue forward in the form of a crank-arm 19, which arm is jointed to the plow-beam near its forward end by a lifting-link 20. This lever is adapted to be locked in different relative positions to lever 11, and for this purpose the latter has fixed to it a bracket-plate 21, containing a series of holes 22, adapted to receive a lug 23, fixed to lever 18. The lug is disengaged from the holes by pushing the lever sidewise, its natural spring permitting this action, and when disengaged may be moved backward and forward to rock the plow-beam, and may be locked in the position desired by engaging the lug in one of the holes.

When the plow-beam and plow are adjusted at any particular height by lever 11, the beam may be rocked by means of lever 18 to level the plow or vary the inclination of its point, as desired, and this while the plow is advancing. By reason of the fact that lever 18 is locked to the lifting-lever the operation of the latter will move lever 18 and will act on the forward end of the beam simultaneously with the action of the crank on the rear end, so that the beam will be lifted bodily in a substantially horizontal position. It is seen, therefore, that while the two levers will move together when lever 11 is operated to elevate or lower the beam the other lever 18 is movable independently of the elevating-lever, so that the operator is enabled to adjust the plow-beam at whatever height it may have been raised by lever 11.

The beam is acted on, as usual, by spiral springs 23× to sustain the same yieldingly in the different positions adjusted, which springs are attached at one end to the crank-axle and at their forward ends to a cross-bar 24, extending horizontally in front of the arched frame and connected thereto. The seeding mechanism, before alluded to as being attached to the beam, embodies a main horizontal frame 25, carrying an opener 26 and coverers 27 in fixed relations, and a secondary frame 28, hinged to the main frame 25, to move vertically with relation thereto, and carrying a seeding mechanism 29, operated by a rotary shaft 30, having fixed to it ground-wheels 31, adapted to travel over the ground and drive the shaft. These parts may be identical with those described in patent to E. P. Lynch, No. 418,526, dated December 31, 1889, and in themselves they constitute no part of the present invention. In order, however, to adapt this mechanism to be controlled as to its relations to the plow as regards the depth of the planting, we provide means within reach of the driver whereby the seeding mechanism as a whole may be conveniently adjusted and held in the desired position. This we accomplish by a vertical hand-lever 32, forming a continuation of one of the two side bars which constitute the main frame 25 of the seeding mechanism. At their forward ends these side bars embrace the rear projecting end of the frog 33 of the plow and are connected thereto by horizontal pivot-pin 34. As shown, one of these bars terminates at this point; but the other is extended beyond the pivot and is curved upward and fashioned into the hand-lever 32, just referred to. When this lever is drawn forward by the driver occupying the seat, the seeding mechanism as a whole is lifted, turning on a pin 34 as an axis, and it may be locked in the position desired by a locking-dog 35, carried by the lever and adapted to engage a rack fixed to the rear curved portion of the beam and extending rearward alongside the lever. It is seen, therefore, that by means of the construction described the driver occupying the seat is enabled to provide for every adjustment of both the plow and seeding mechanism which may be required. By one lever he is enabled to rock the beam to maintain the level of the plow without regard to its elevation and by another he is enabled to properly adjust the seeding mechanism to meet the adjustment of the other parts.

Having thus described our invention, what we claim is—

1. In combination with a crank-axle, ground-wheels thereon, a frame sustained by the axle, a plow-beam jointed to and sustained wholly by the axle, a hand-lever mounted on the frame, connections between the lever and axle for bodily lifting the beam, a second hand-lever adjacent to the first, and connections between the same and the beam for rocking the latter on the crank-axle.

2. In combination with the axle having a central cranked portion and horizontal ends, ground-wheels mounted on the ends of the axle, a frame sustained on the ends of the axle, a plow-beam jointed to and sustained wholly by the cranked portion of the axle, a hand-lever mounted on the frame, connections between the hand-lever and the cranked portion of the axle, a second hand-lever sustained by the frame, and connections between this lever and the beam.

3. In combination with the frame, a vertically-movable rocking plow-beam, a hand-lever mounted on the frame, and operatively connected with the beam, a second hand-lever movable independently of the first, means for locking the levers together, and connections between the second hand-lever and the beam for rocking it.

4. In combination with a crank-axle, ground-wheels thereon, a plow-beam jointed to the axle, a hand-lever mounted on the frame, means for locking the lever to the frame, a connection between the lever and the crank-axle, a second hand-lever adjacent to the first, a plate fixed to the first hand-lever to which the second hand-lever is adapted to be locked, and a connection between the second hand-lever and the beam.

5. In combination with a crank-axle, ground-wheels thereon, a frame sustained by the axle, a plow-beam jointed to the axle, a hand-lever provided with a crank-arm mounted loosely in the frame, a connection between the crank-arm and the plow-beam, a second hand-lever mounted loosely on the crank-arm, and a connection between the second lever and the crank-axle.

6. In combination with the axle and ground-wheels, a frame sustained thereby, a vertically-movable rocking plow-beam, a hand-lever operatively connected with the beam and adapted to raise the same bodily, a second hand-lever movable independently of the first, means for locking the levers together, and suitable connections between the second hand-lever and the beam for rocking the latter.

7. In combination with the plow-beam, a seeding mechanism having a connection therewith and movable vertically with relation thereto, a hand-lever connected with the seeding mechanism and extending forwardly and upwardly in advance of the same, and means for locking said lever in fixed relations to the beam.

8. In combination with a plow-beam, a moldboard-plow, a frog connecting said parts, a seeding mechanism embodying a frame having a side bar pivoted to the frog and extending upward and forward in advance of the seeding mechanism in the form of a hand-lever.

9. In combination with a plow-beam, a seeding mechanism sustained thereby in rear of the same to move vertically, a hand-lever connected with the seeding mechanism and extending forward and upward in front of the same, a locking-dog on the lever, and a rack connected with the beam and engaged by the dog.

10. In combination with a plow-beam and its plow and connecting-frog, a seeding mechanism embodying a frame having two parallel side bars pivoted to the frog, one of said side bars terminating at the pivotal connection and the other extending upward to form a lever.

11. In combination with the wheeled frame, a plow-beam sustained thereby, means for adjusting the same vertically, means for rocking the beam when adjusted, and a seeding mechanism having a connection with the beam and movable vertically with relation thereto, and means for adjusting the seeding mechanism vertically.

In testimony whereof we hereunto set our hands, this 3d day of August, 1899, in the presence of two attesting witnesses.

SAMUEL B. STOKELY.
WINFIELD S. LIVENGOOD.

Witnesses:
W. D. FRACE,
J. A. STOKELY.